United States Patent [19]

Ikeda et al.

[11] Patent Number: 5,501,104
[45] Date of Patent: Mar. 26, 1996

[54] METHOD OF MEASURING THE DEPTH OF FULL-CUT DICING GROOVES BY USING AN ULTRASONIC DETECTOR AND A DICING APPARATUS FOR CARRYING OUT THE SAME

[75] Inventors: Hotaka Ikeda; Masaharu Nakamura, both of Mitaka, Japan

[73] Assignee: Tokyo Seimitsu Co., Ltd., Tokyo, Japan

[21] Appl. No.: 197,192

[22] Filed: Feb. 16, 1994

[30] Foreign Application Priority Data

Feb. 23, 1993 [JP] Japan ..................... 5-033406

[51] Int. Cl.⁶ ..................... G01S 15/88
[52] U.S. Cl. ............. 73/629; 437/226; 437/227
[58] Field of Search .............. 73/597, 598, 602, 73/629, 105, 627, 620, 618; 367/99; 437/226, 227

[56] References Cited

U.S. PATENT DOCUMENTS

| | | | |
|---|---|---|---|
| 3,813,926 | 6/1974 | Stubbeman | 73/629 |
| 3,991,296 | 11/1976 | Kojima et al. | 437/227 |
| 4,364,264 | 12/1982 | Re Fiorentin | 73/105 |
| 4,814,296 | 3/1989 | Jedlicka et al. | 437/226 |
| 5,062,297 | 11/1991 | Hashimoto et al. | 73/597 |
| 5,128,282 | 7/1992 | Ormond et al. | 437/226 |

FOREIGN PATENT DOCUMENTS

| | | |
|---|---|---|
| 3425811 | 3/1985 | Germany. |
| 4-267106 | 9/1992 | Japan. |
| 2070248 | 9/1981 | United Kingdom. |

*Primary Examiner*—Hezron E. Williams
*Assistant Examiner*—Rose M. Finley
*Attorney, Agent, or Firm*—Nikaido, Marmelstein, Murray & Oram

[57] ABSTRACT

The present invention provides a method of measuring the depth of a dicing groove capable of measuring the depth of the groove with a high accuracy when the groove is cut in a full-cut mode, which method employs an ultrasonic detector which emits ultrasonic waves, measures the time interval between the emission of the ultrasonic waves and the return of their echo, the phase difference between the emitted ultrasonic waves and the reflected ultrasonic waves, or both the time interval and the phase difference to measure the depth of the groove, and is featured by determining the depth of the dicing groove on the basis of the depth of the groove formed in an exposed area of the adhesive sheet not occupied by the workpiece.

10 Claims, 7 Drawing Sheets

METHOD OF MEASURING THE DEPTH OF FULL-CUT DICING GROOVES BY USING AN ULTRASONIC DETECTOR AND A DICING APPARATUS FOR CARRYING OUT THE SAME

BACKGROUND OF THE INVENTION

1. Field of the Invention

The present invention relates to a method of measuring a groove formed by a dicing apparatus, by an ultrasonic detector, and a dicing apparatus provided with an ultrasonic detector and capable of measuring the depth of a groove and, more particularly, to a method capable of very accurately measuring the depth of a dicing groove cut in a workpiece in a full-cut mode in which the dicing groove is cut as deep as the periphery of a cutting blade which reaches the surface of an adhesive sheet fixedly holding the workpiece to dice the workpiece completely and the depth of a dicing groove cut in the workpiece in a half-cut mode in which the dicing groove is cut so that the workpiece is not diced completely, and to a dicing apparatus for carrying out the same.

2. Description of the Related Art

A dicing apparatus, which cuts a narrow groove in a workpiece with a cutting blade rotating at a high rotating speed, is applied widely to cutting of semiconductor wafers provided with semiconductor devices thereon, into semiconductor chips. A dicing apparatus as applied, by way of example, to cutting a groove in a semiconductor wafer will be described.

In the dicing apparatus, a stage supporting the semiconductor wafer is moved relative to a cutting blade rotating at a high speed to cut a groove in the semiconductor wafer. Although the semiconductor wafer is fixedly supported on the stage, generally, the semiconductor wafer is stuck on an adhesive sheet, and then the adhesive sheet adhesively holding the semiconductor wafer is held fixedly on the stage to prevent semiconductor chips formed by dicing the semiconductor wafer from scattering during processing. A workpiece other than a semiconductor wafer may be directly attached to the stage with an adhesive. An adhesive sheet is stuck to one surface of a frame having a central hole formed by punching and having a diameter greater than that of the semiconductor wafer, and the semiconductor wafer 1 is stuck on the adhesive surface of the adhesive sheet, and the frame thus holding the semiconductor wafer is fixedly mounted on the stage. In production processes of semiconductor devices, a semiconductor wafer is transferred from one process to the next in a state described above.

When cutting a groove in the semiconductor wafer, the groove is cut, depending on the requirements of the following processes, in a full-cut mode in which the groove is cut so that the semiconductor chips are diced completely or in a half-cut mode in which the groove is cut in the semiconductor wafer so that the depth of the groove is smaller than the thickness of the semiconductor wafer. In the full-cut mode, the position of the cutting blade relative to the stage is adjusted before starting the cutting operation so that the periphery of the cutting blade will reach the adhesive sheet. In the half-cut mode the position of the cutting blade relative to the stage is adjusted before starting the cutting operation so that the periphery of the cutting blade will not reach the bottom surface of the semiconductor wafer.

The accurate control of the depth of the groove is essential to the dicing process to avoid producing defective products. When adjusting the position of the periphery of the cutting blade, the periphery of the rotating cutting blade is brought into contact with the surface of the stage or a surface at a fixed height from the surface of the stage, the position of the periphery of the cutting blade is measured, and the position of the cutting blade is adjusted taking into consideration the thickness of the adhesive sheet so that the position of the periphery of the cutting blade and the surface of the stage satisfy a predetermined relation. Since the cutting blade is abraded with the progress of the dicing process, the position of the periphery of the cutting blade is measured and corrected whenever necessary for the further accurate control of the groove.

However, since the dicing operation must be interrupted for the measurement of the position of the periphery of the cutting blade, the frequent measurement of the position of the periphery of the cutting blade will deteriorate the efficiency of the cutting process.

Therefore, the position of the periphery of the cutting blade is corrected on the basis of the empirically predetermined relation between the quantity of cut material and the abrasion of the blade. When the position of the periphery of the cutting blade is thus corrected, the position of the periphery of the cutting blade can be more correctly controlled. However, since the abrasion of the blade is dependent on its quality and the cutting conditions are variable, such a method of controlling the position of the periphery of the cutting blade is not completely satisfactory.

The applicant of the present patent application proposed a dicing apparatus capable of measuring the shape of the groove, i.e., the depth and width of the groove, with an ultrasonic detector in Japanese Unexamined Patent Publication No. 4-267106. In this dicing apparatus, the ultrasonic detector emits ultrasonic waves intermittently, detects the reflected ultrasonic waves, and calculates the distance between the ultrasonic detector and a surface facing the ultrasonic detector on the basis of the time interval between the emission of the ultrasonic wave and the return of its echo from the surface, the phase difference between the emitted ultrasonic waves and their echo, or both the time interval and the phase difference. The shape of the groove and, naturally, the depth of the groove can be measured by moving the ultrasonic detector so as to scan the groove formed in the wafer. In the dicing apparatus, pure water is supplied as a cutting fluid. The pure water filling the space between the ultrasonic detector and the object surface improves the propagation efficiency of the ultrasonic waves and measuring accuracy. This dicing apparatus is capable of detecting chipped parts, such as a chipped part in the edge of the groove.

Since the ultrasonic detector is capable of measuring the shape of the groove even if pure water is used as a cutting fluid, the cutting process need not be interrupted for the measurement and the possibility of continuous monitoring of the shape of the groove reduces faulty cutting.

Since the ultrasonic detector emits the ultrasonic wave intermittently and detects the reflected ultrasonic waves, the detection efficiency is greatly dependent on the ultrasonic reflectance of the surface facing the ultrasonic detector. Since the ultrasonic reflectance of the adhesive sheet is far smaller than that of the wafer 1, the reflection of the ultrasonic waves by the groove is reduced greatly when the groove is cut through the wafer into the adhesive sheet in the full-cut mode and hence the accurate measurement of the groove is difficult in this state. Such a difficulty may be overcome by enhancing the detection sensitivity, however, since the ultrasonic waves emitted by the ultrasonic detector spread to some extent and the reflectance of the side surfaces of the groove 100 is comparatively high, the accurate measurement of the depth of the groove is difficult because the ultrasonic waves reflected by the side surfaces of the groove act as noise.

SUMMARY OF THE INVENTION

The present invention has been made in view of the foregoing problems and it is therefore an object of the present invention to provide a depth measuring method capable of accurately measuring the depth of a dicing groove cut in a workpiece in a full-cut mode by a dicing apparatus provided with an ultrasonic detector for continuously measuring the depth of a dicing groove.

The present invention is applied to a method of measuring the depth of a dicing groove formed in a workpiece in the full-cut mode, in which the groove is cut through the workpiece into the adhesive sheet to cut the workpiece completely into chips, by an ultrasonic detector. The ultrasonic detector emits ultrasonic waves, measures the time interval between the emission of the ultrasonic waves and the return of an echo, the phase difference between the emitted ultrasonic wave and the reflected ultrasonic wave, or both the time interval and the phase difference, to measure the depth of the groove. The method of measuring the depth of a dicing groove in accordance with the present invention is featured by determining the depth of the dicing groove on the basis of the depth of the groove formed in an exposed area of the adhesive sheet not occupied by the workpiece.

The method of measuring the depth of a dicing groove in accordance with the present invention determines the depth of the dicing groove on the basis of the measured depth of the extension groove formed in an exposed area of the adhesive sheet not occupied by the workpiece and, therefore, the ultrasonic detector can be positioned at a comparatively small distance from the extension groove formed in the adhesive sheet. Accordingly, the attenuation and spread of the ultrasonic waves emitted by the ultrasonic detector during travel from the ultrasonic detector to the extension groove of the adhesive sheet can be reduced and, consequently, the detection sensitivity and the resolution of the ultrasonic detector can be improved.

Since the groove does not lie between the ultrasonic detector and the extension groove, the measurement is scarcely affected by noise even if the detection sensitivity of the ultrasonic detector is increased, so that the detection sensitivity and the measuring accuracy can be improved.

Since the extension groove is formed in the adhesive sheet in the exposed area of the adhesive sheet not occupied by the workpiece when cutting the groove in the full-cut mode, the conventional cutting process need not be changed for the measurement of the depth of the extension groove.

BRIEF DESCRIPTION OF THE DRAWINGS

The present invention will be more clearly understood from the description as set forth below with reference to the accompanying drawings, wherein.

DESCRIPTION OF THE PREFERRED EMBODIMENTS

Before proceeding to a detailed description of the preferred embodiments of the present invention, a prior art method of measuring a groove formed by a dicing apparatus by an ultrasonic detector will be explained. In FIGS. 1 to 9 used for explanation, like or corresponding parts are indicated by the same reference characters and a duplicate description thereof will be omitted.

Figure 1:
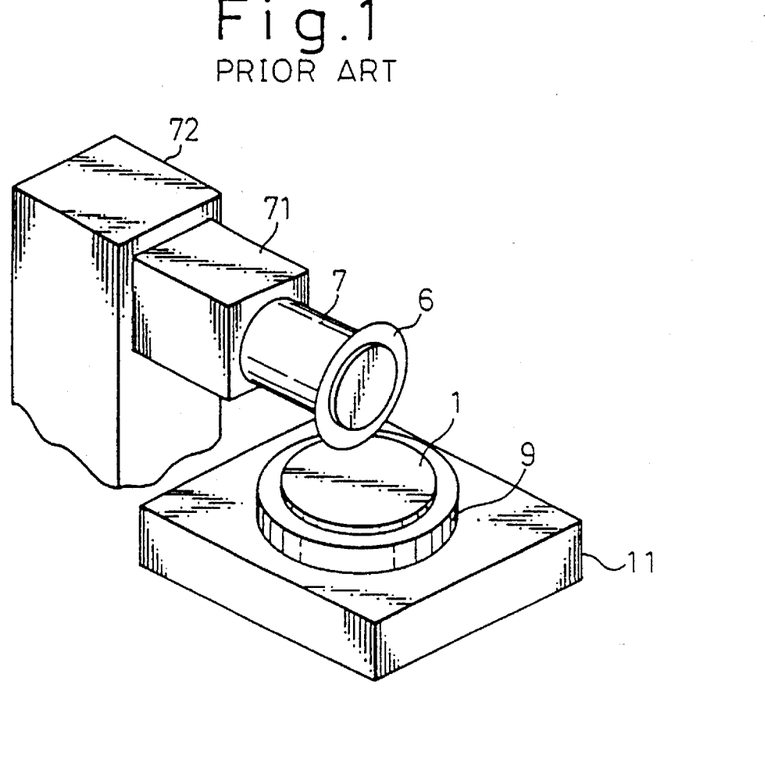
FIG. 1 is a perspective view of a conventional dicing apparatus.

FIG. 1 shows the basic construction of a dicing apparatus. In FIG. 1, reference 1 indicates a semiconductor wafer 1 to be subjected to dicing; 6 indicates a cutting blade formed by bonding abrasive grains of diamond or the like with nickel or the like; 7 indicates a spindle motor supporting the cutting blade 6 on the driving shaft thereof to rotate the cutting blade 6 at a high rotating speed; 7 indicates a spindle motor; 71 and 72 indicate spindle motor moving mechanisms for holding the spindle motor 7 and moving the same in directions along the axis of the spindle motor 7 and vertical directions; 9 indicates a stage for fixedly supporting the semiconductor wafer 1 thereon by suction; 11 indicates a stage moving mechanism for moving the stage 9 in directions along a groove cutting line. The rotating cutting blade 6 can three-dimensionally be positioned relative to the semiconductor wafer 1 by the operations of the spindle motor moving mechanisms 71 and 72, and the stage moving mechanism 11. The stage 9 supporting the semiconductor wafer 1 is moved relative to the cutting blade 6 to cut a groove in the semiconductor wafer 1.

Figure 7:
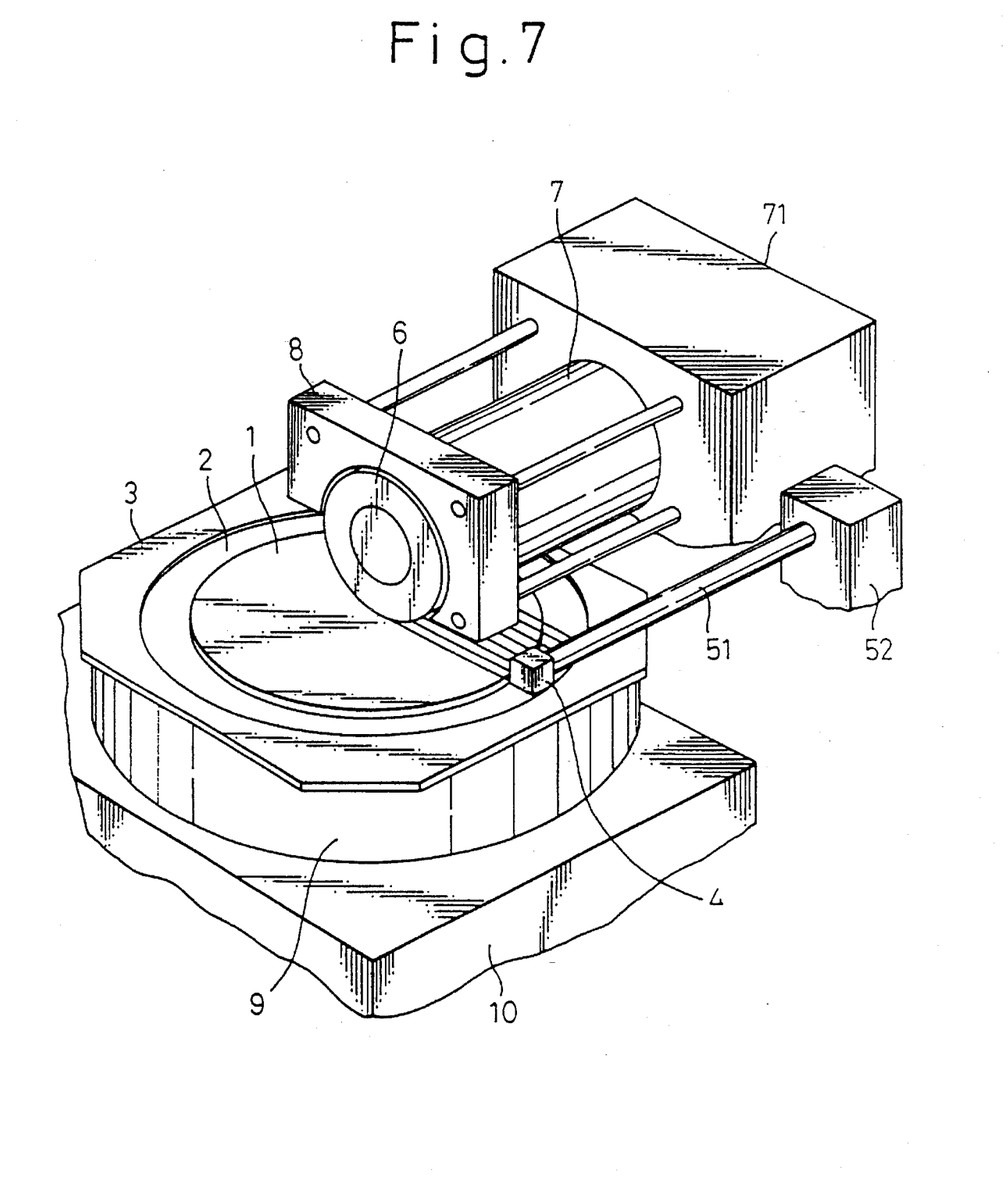
FIG. 7 is a perspective view of a dicing apparatus in a preferred embodiment according to the present invention.

As described previously, the semiconductor wafer 1 is stuck on an adhesive sheet, and then the adhesive sheet adhesively holding the semiconductor wafer 1 is held fixedly on the stage 9 to prevent semiconductor chips formed by dicing the semiconductor wafer 1 from scattering during processing. FIG. 7 shows an adhesive sheet 2 which is stuck to one surface of a frame 3 having a central hole formed by punching and having a diameter greater than that of the semiconductor wafer 1. The semiconductor wafer 1 is stuck on the adhesive surface of the adhesive sheet 2, and the frame 3 thus holding the semiconductor wafer 1 is fixedly mounted on the stage 9.

Figure 3A:
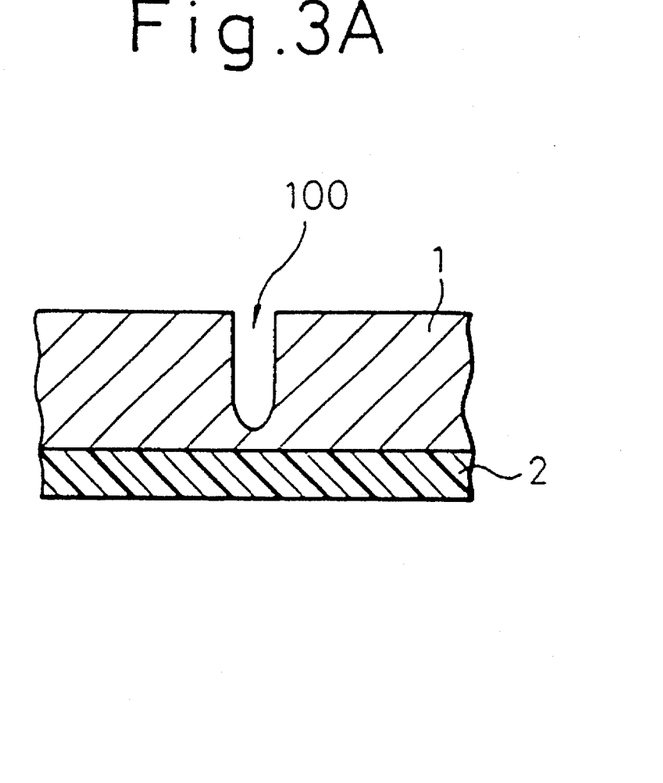
FIGS. 3A and 3B are sectional views of assistance in explaining a half-cut mode and a full-cut mode of operation of a dicing apparatus.
Figure 3B:
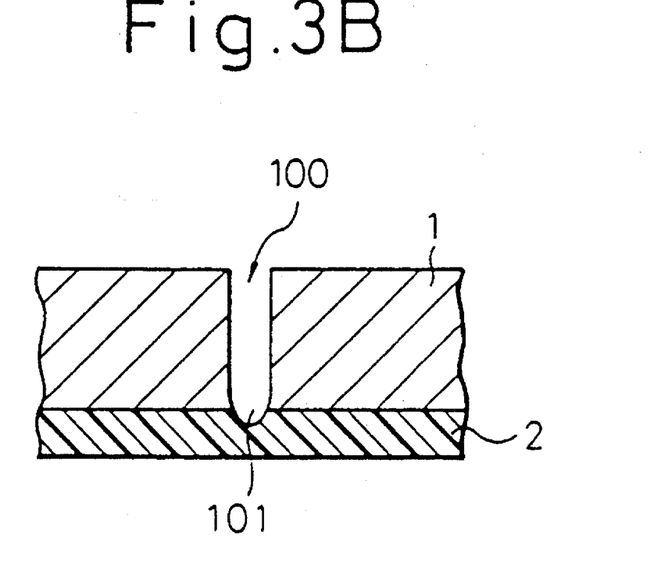

FIG. 3A shows a groove cut in the half-cut mode and FIG. 3B shows a groove cut in the full-cut mode. In the full-cut mode, the position of the cutting blade 6 relative to the stage 9 is adjusted before starting the cutting operation so that the periphery of the cutting blade will reach the adhesive sheet 2. In the half-cut mode the position of the cutting blade 6 relative to the stage 9 is adjusted before starting the cutting operation so that the periphery of the cutting blade will not reach the bottom surface of the semiconductor wafer.

Figure 4:
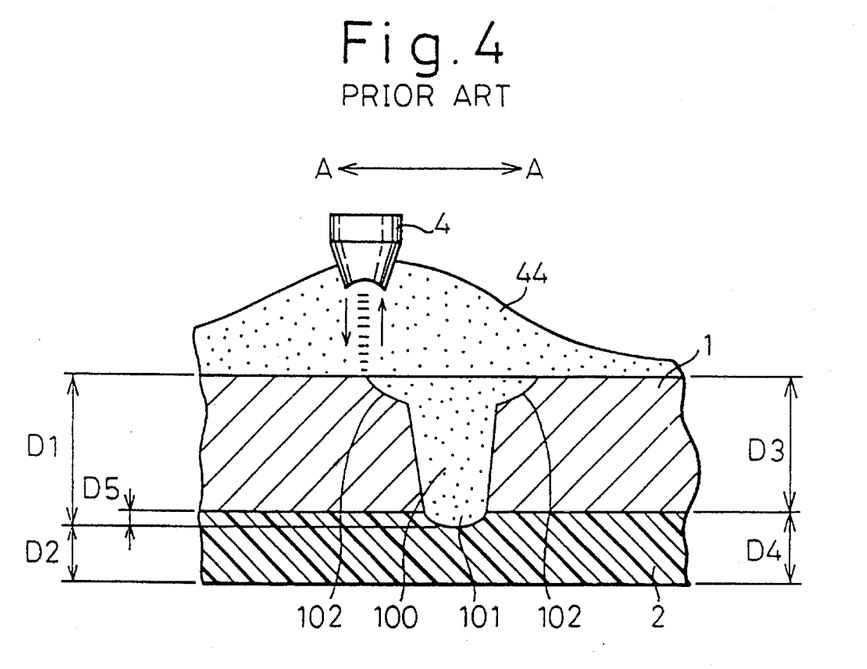
FIG. 4 is a sectional view of assistance in explaining a conventional method of measuring the shape of a groove with an ultrasonic detector on a dicing apparatus.
Figure 9:
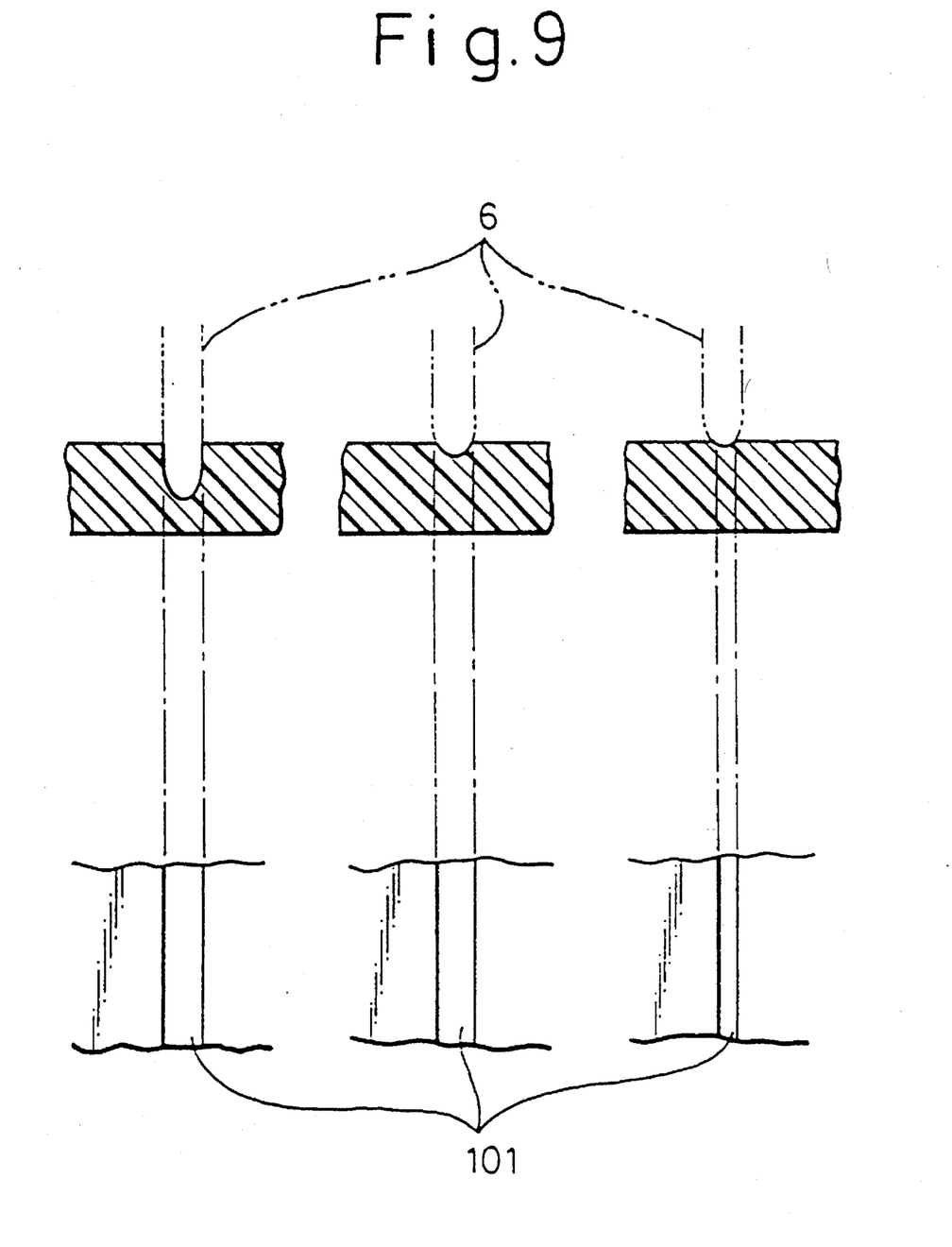
FIG. 9 is a diagrammatic view showing the different positions of the periphery of a cutting blade relative to an adhesive sheet and different widths of a groove respectively corresponding to the different positions of the periphery of the cutting blade.

As described previously, the accurate control of the depth of the groove is essential to the dicing process to avoid producing defective products. FIG. 4 is a sectional view for explaining a conventional method of measuring the shape of a groove with an ultrasonic detector on a dicing apparatus proposed by the applicant of the present invention in Japanese Unexamined Patent Publication No. 4-267106. In FIG. 4, reference 4 indicates an ultrasonic detector of this dicing apparatus; 100 indicates a groove cut in a wafer 1; and 44 indicates pure water serving as a cutting fluid. In FIG. 4, the groove 100 is cut to the adhesive sheet 2 in the full-cut mode and a groove 101 is formed in the adhesive sheet 2. Referring to FIG. 4, the ultrasonic detector 4 emits ultrasonic waves intermittently, detects the reflected ultrasonic waves, and calculates the distance between the ultrasonic detector 4 and a surface facing the ultrasonic detector 4 on the basis of the time interval between the emission of the ultrasonic waves and the return of its echo from the surface, the phase difference between the emitted ultrasonic waves and their echo, or both the time interval and the phase difference. The shape of the groove 100 and the depth of the groove 100 can be measured by moving the ultrasonic detector 4 so as to scan the groove 100 formed in the wafer 1. The pure water 44 filling the space between the ultrasonic detector 4 and the object surface improves the propagation efficiency of the ultrasonic wave and measuring accuracy. This dicing apparatus is capable of detecting chipped parts, such as a chipped part 102 in the edge of the groove 100 as shown in FIG. 9.

Since the ultrasonic detector is capable of measuring the shape of the groove even if pure water is used as a cutting fluid, the cutting process need not be interrupted for the measurement and the possibility of continuous monitoring of the shape of the groove reduces faulty cutting.

However, as described above, since the ultrasonic detector 4 emits the ultrasonic wave intermittently and detects the reflected ultrasonic waves, the detection efficiency is greatly dependent on the ultrasonic reflectance of the surface facing the ultrasonic detector 4. Since the ultrasonic reflectance of the adhesive sheet 2 is far smaller than that of the wafer 1, the reflection of the ultrasonic waves by the groove is reduced greatly when the groove 100 is cut through the wafer 1 into the adhesive sheet 2 as shown in FIG. 4 in the full-cut mode and hence the accurate measurement of the groove 100 is difficult in this state. Such a difficulty may be overcome by enhancing the detection sensitivity, however, since the ultrasonic waves emitted by the ultrasonic detector spread to some extent and the reflectance of the side surfaces of the groove 100 is comparatively high, the accurate measurement of the depth of the groove 100 is difficult because the ultrasonic wave reflected by the side surfaces of the groove 100 acts as noise.

Figure 5:
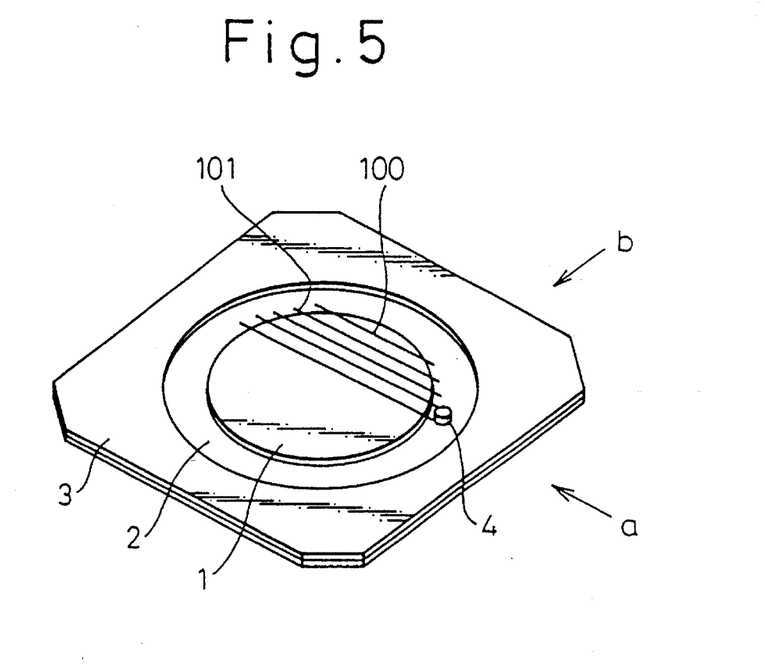
FIG. 5 is a perspective view of assistance in explaining the fundamental principle on which the method of measuring the depth of a dicing groove in accordance with the present invention.

FIG. 5 is a perspective view of assistance in explaining the fundamental principle on which a method of measuring the depth of a dicing groove in accordance with the present invention is based. Referring to FIG. 5, a plate-shaped workpiece 1 to be subjected to a dicing groove cutting process is stuck on an adhesive sheet 2 to cut a groove 100 in the workpiece 1 with a cutting blade rotating at a high rotating speed. A method of measuring the depth of a dicing groove in accordance with the present invention measures the depth of the groove 100 formed in the workpiece in the full-cut mode, in which the groove 100 is cut through the workpiece 1 into the adhesive sheet 2 to cut the workpiece 1 completely into chips, by an ultrasonic detector 4. The ultrasonic detector 4 emits ultrasonic waves, measures the time interval between the emission of the ultrasonic waves and the return of its echo, the phase difference between the emitted ultrasonic waves and the reflected ultrasonic waves, or both the time interval and the phase difference to measure the depth of the groove 100. The method in accordance with the present invention is featured by determining the depth of the dicing groove on the basis of the depth of the groove 101 formed in an exposed area of the adhesive sheet not occupied by the workpiece 1.

Figure 6A:
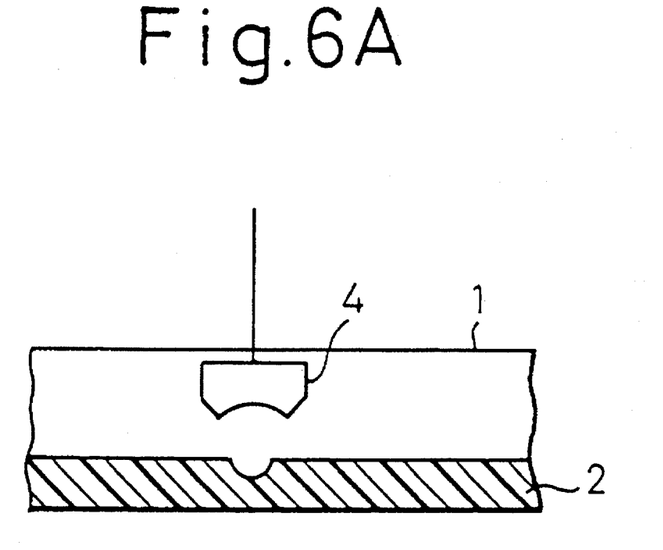
FIGS. 6A and 6B are a sectional view and a side view, respectively, illustrating the positional relation between an ultrasonic detector and a groove to be measured by the present invention.
Figure 6B:
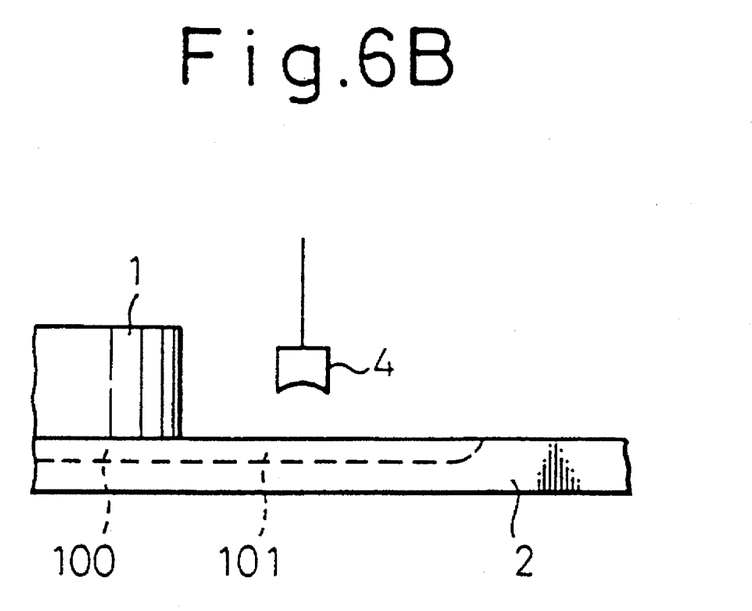

FIGS. 6A and 6B illustrate the positional relation between the ultrasonic detector 4 employed in carrying out the method of the present invention and the extension groove 101 to be subjected depth measurement.

The method in accordance with the present invention determines the depth of the dicing groove on the basis of the measured depth of the extension groove 101 formed in an exposed area of the adhesive sheet 2 not occupied by the workpiece 1 and, therefore, the ultrasonic detector 4 can be positioned at a comparatively small distance from the extension groove 101 formed in the adhesive sheet 2. Accordingly, the attenuation and spread of the ultrasonic waves emitted by the ultrasonic detector 4 during travel from the ultrasonic detector 4 to the extension groove 101 of the adhesive sheet 2 can be reduced and, consequently, the detection sensitivity and the resolution of the ultrasonic detector 4 can be improved. Since the groove 100 does not lie between the ultrasonic detector 4 and the extension groove 101, the measurement is scarcely affected by noise even if the detection sensitivity of the ultrasonic detector 4 is increased, so that the detection sensitivity and the measuring accuracy can be improved.

Since the extension groove 101 is formed in the adhesive sheet 2 in the exposed area of the adhesive sheet 2 not occupied by the workpiece 1 when cutting the groove 100 in the full-cut mode, the conventional cutting process need not be changed for the measurement of the depth of the extension groove 101.

Figure 2:
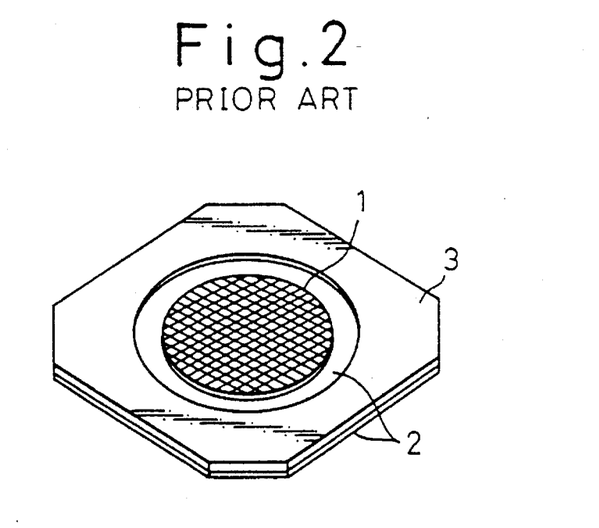
FIG. 2 is a perspective view of a semiconductor wafer held on an adhesive sheet stuck on a frame to be supported on a dicing apparatus to process the semiconductor wafer for dicing.

FIG. 7 is a perspective view of a dicing apparatus in a preferred embodiment according to the present invention, which carries out a method of measuring the depth of a dicing groove in accordance with the present invention. Referring to FIG. 7, a semiconductor wafer 1, similarly to the semiconductor wafer 1 shown in FIG. 2, is stuck on an adhesive sheet 2 stuck on a frame 3 and is held fixedly on a stage 9 by suction. The stage 9 is moved by a stage moving mechanism 10 along a groove cutting line. A cutting blade 6 is rotated at a high rotating speed by a spindle motor 7. A safety guard 8 is fixedly connected to a motor base 71 holding the spindle motor 7 by stay rods so as to partly cover the circumference of the cutting blade 6.

An ultrasonic detector 4 is attached to an arm 51, which is moved by an arm moving mechanism 52. As mentioned above, since the ultrasonic detector 4 must be moved across a groove to be subjected to depth measurement when scanning the groove to measure the depth of the same, it is necessary that the ultrasonic detector 4 can be moved along the axis of the arm 51. However, since the cutting blade 6 is moved axially by moving the motor base 71 to cut grooves successively, the ultrasonic detector 4 need not be moved in a wide range, when the ultrasonic detector 4 is used for measuring the depth of the groove being currently cut with the cutting blade 6. Basically, the arm 51 need not be moved in a horizontal plane in directions perpendicular to the axis thereof. When measuring the depth of the extension groove cut in the exposed area of the adhesive tape 2 not occupied by the wafer 1, the ultrasonic detector 4 is moved toward the adhesive sheet 2 to position the ultrasonic detector 4 at an extension groove measuring position very close to the adhesive sheet 2 as shown in FIGS. 6A and 6B. If the ultrasonic detector 4 is held at the extension groove measuring position, the ultrasonic detector 4 will collide against the wafer 1 when the ultrasonic detector 4 is moved horizontally relative to the wafer 1. Therefore, the ultrasonic detector 4 must be capable of being moved vertically in a comparatively narrow range. Thus, the arm moving mechanism 52 may be capable of moving the arm 51 in both horizontal and vertical directions, i.e., in directions along the axis of the arm 51 and in vertical directions, in comparatively narrow ranges. Therefore, the dicing apparatus may be provided with a turning mechanism disclosed in Japanese Patent Application No. 3-28685 so as to be able to turn independently in two directions.

Figure 8A:
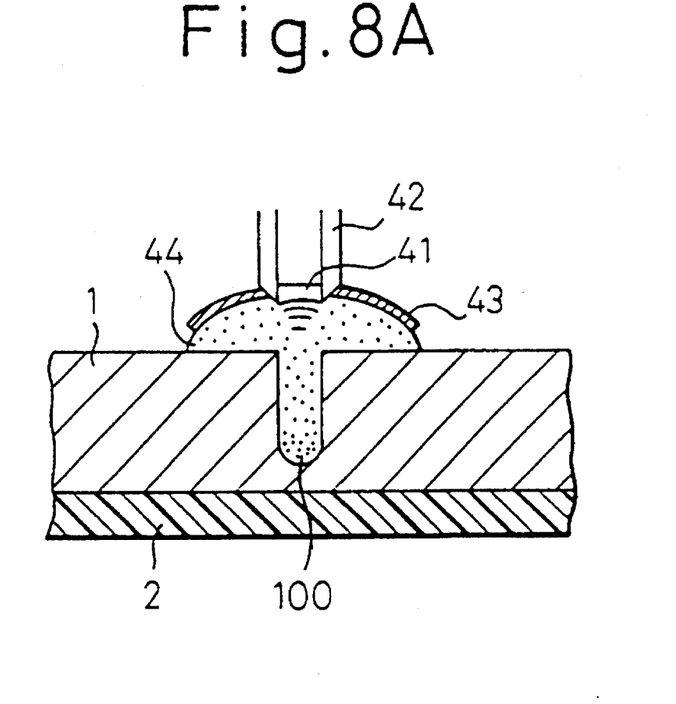
FIGS. 8A and 8B are sectional views showing the construction of the nose of an ultrasonic detector included in the dicing apparatus embodying the present invention, and the positional relations between the nose of the ultrasonic detector and a dicing groove for cutting operation respectively in half-cut mode and a full-cut mode.
Figure 8B:
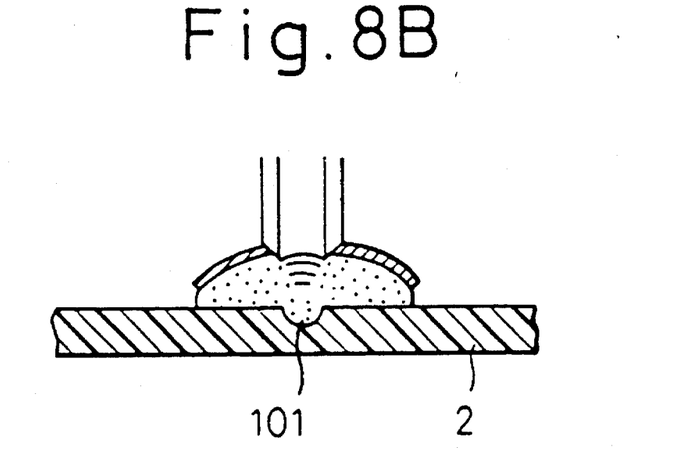

The dicing apparatus in this embodiment is capable of measuring the groove cut in the exposed area of the adhesive sheet 2 not occupied by the wafer 1 when the dicing apparatus operates in the full-cut mode and of measuring the groove cut in the wafer 1 when the dicing apparatus operates in the half-cut mode. FIGS. 8A and 8B show the construction of the nose of the ultrasonic detector 4 and the positional relation between the nose of the ultra-sonic detector a and the dicing groove respectively in the half-cut mode and the full-cut mode. FIG. 8A shows a manner of measuring the dicing groove cut in the wager 1 while the dicing apparatus operates in the half-cut mode and FIG. 8B shows a manner of measuring the extension groove cut in the exposed area of the adhesive sheet 2 not occupied by the wafer 1 while the dicing apparatus operates in the full-cut mode.

Referring to FIG. 8A, an ultrasonic echo sounder transducer 41, such as a magnetostriction transducer, an electrostriction transducer or a piezoelectric transducer, sends out ultrasonic waves for a predetermined period according to an oscillation signal provided intermittently and converts the returned ultrasonic waves into an electric signal. The ultrasonic echo sounder transducer 41 has a generally known configuration and hence the description thereof will be omitted. The ultrasonic echo sounder transducer 41 is contained in a case 42. A skirt 43 holds pure water on the surface of the wafer 1. As mentioned above, if the ultrasonic wave is transmitted through air, ultrasonic waves, particularly ultrasonic waves having a high frequency, as attenuated greatly. Therefore, pure water flowed over the wafer 1 as a cutting fluid is held between the ultrasonic echo sounder transducer 41 and the measured surface to be used as a transmission medium. Since pure water has a comparatively small surface tension and is difficult to hold stably on the measured surface, the skirt 42 is used to hold pure water stably on the measured surface.

As is obvious from FIGS. 8A and 8B, the vertical position of the ultrasonic echo sounder transducer must be changed by the arm moving mechanism 52 when the cutting mode is changed between the half-cut mode and the full-cut mode. In the full-cut mode, the position of the periphery of the cutting blade 6, i.e., the depth of the groove, may be measured through the measurement of the shape of the groove on the surface of the wafer 1 instead of measuring the position of the periphery of the cutting blade 6 only in the exposed area of the adhesive sheet 2 not occupied by the wafer 1.

Although the ultrasonic detector 4 is held on the arm 51 in the dicing apparatus shown in FIG. 7, the arm moving mechanism 52 may be attached to the safety guard 8. When the arm moving mechanism 52 is attached to the safety guard 8, the arm 51 need not be very long.

In the foregoing arrangement, since the ultrasonic detector 4 can be disposed close to the surface of the adhesive sheet 2, even the depth of the extension groove formed in the adhesive sheet 2 having a comparatively low ultrasonic reflectance can be measured with a high measuring accuracy.

The peripheral part of the cutting blade 6 is abraded with the progress of the cutting operation and, particularly, the edges of the periphery of the cutting blade 6 are abraded at a high rate. Accordingly, the peripheral part of the cutting blade 6 initially having rectangular edges is abraded gradually in a round or oval shape and, consequently, grooves having a round bottom surface as shown in FIGS. 8A and 8B are formed. Such a round bottom surface is unable to reflect the ultrasonic waves toward the ultrasonic detector 4, which is one of the causes of reduction in the detection sensitivity of the ultrasonic detector 4. Although the measuring accuracy of the dicing apparatus in this embodiment is higher than that of the conventional dicing apparatus, the dicing apparatus still has problems in measuring accuracy attributable to the abrasion of the cutting blade 6. A dicing apparatus in a second embodiment according to the present invention is intended to solve such problems.

As described previously, the ultrasonic detector is moved across the groove when scanning the groove to measure the depth of the groove. The difference between the distance between the ultrasonic detector and the bottom surface of the groove and the distance between the ultrasonic detector and the surface of the wafer 1 or that of the adhesive sheet 2 can be determined by moving the ultrasonic detector across the groove, and the width, the shape of the edges and the depth of the groove can be measured. Since the sectional shape of the peripheral part of the cutting blade 6 is round or oval and is not rectangular, the width of the groove is dependent on the depth of the same if the depth of the extension groove cut in the adhesive sheet 2 is comparatively small. FIG. 9 shows the relation between the position of the periphery of the cutting blade 6 relative to the adhesive sheet 2, and the width of the extension groove. As shown in FIG. 9, the different widths of the extension groove respectively corresponding to the different positions of the periphery of the cutting blade. As is obvious from FIGS. 4 and 9, the depth of the groove can be determined from the measured width of the groove, when the shape of the peripheral part of the cutting blade is determined beforehand on the basis of empirical data. Since the width of the groove can be measured in a measuring accuracy higher than that in which the depth of the groove can be measured, the determination of the depth of the groove from the measured width of the groove is more accurate than the direct measurement of the depth of the groove.

As is apparent from the foregoing description, in the method of measuring the depth of a dicing groove and the dicing apparatus in accordance with the present invention, the ultrasonic detector can be positioned close to the groove to measure the depth of the extension groove cut in the adhesive sheet 2 when the dicing apparatus operates in the full-cut mode, and the measurement of the depth of the extension groove is not affected by the groove cut in the wafer. Accordingly, the depth of the extension groove can be measured with an improved measuring accuracy. Since the shape of the extension groove formed in the adhesive sheet 2 is measured, the width of the extension groove proportional to the depth of cut of the cutting blade in the adhesive tape can be determined and the depth of the dicing groove can be determined by calculation using the width of the extension groove cut in the adhesive sheet.

We claim:

1. A method of measuring a depth of a dicing groove cut in a workpiece, said method comprising the steps of:

providing a plate-shaped workpiece adhered to an adhesive sheet;

providing a dicing apparatus with a cutting blade rotating at a high speed thereupon;

providing an ultrasonic detector which emits ultrasonic waves;

cutting a groove in said plate-shaped workpiece with said cutting blade, said groove extending through a thickness of the workpiece;

emitting ultrasonic waves from said ultrasonic detector;

measuring at least one of the time interval between the emission of the ultrasonic waves and a return of an echo of the ultrasonic waves from the workpiece, and a phase difference between the emitted ultrasonic waves and the echo thereof;

wherein said cutting step includes cutting an extension groove in the adhesive sheet in an exposed area thereof not occupied by the plate-shaped workpiece, and wherein said measuring step includes measuring a depth of the extension groove.

2. A method of measuring as recited in claim 1, further comprising a step of providing a peripheral portion of the cutting blade with a predetermined sectional shape, wherein the step of measuring the depth of the extension groove is based upon a width of the extension groove as detected by the ultrasonic detector, and the sectional shape of the peripheral part of the cutting blade.

3. A method of measuring according to claim 1, further comprising a step of flowing water over the workpiece during said cutting step, said water being held on the surface of the workpiece by a skirt.

4. A method of measuring according to claim 2, further comprising a step of flowing water over the workpiece during said cutting step, said water being held on the surface of the workpiece by a skirt.

5. A method of measuring a depth of a dicing groove cut in a workpiece, said method comprising the steps of:

providing a plate-shaped workpiece adhered to an adhesive sheet;

providing a dicing apparatus with a cutting blade rotating at a high speed thereupon;

providing an ultrasonic detector which emits ultrasonic waves;

cutting a groove in said plate-shaped workpiece with said cutting blade;

emitting ultrasonic waves from said ultrasonic detector;

measuring at least one of the time interval between the emission of the ultrasonic waves and a return of an echo of the ultrasonic waves from the workpiece, and a phase difference between the emitted ultrasonic waves and the echo thereof;

wherein said cutting step includes a step of half-cutting the dicing groove by cutting partially through a thickness of the workpiece, and a step of cutting an extension groove in the adhesive sheet in an exposed area thereof, said exposed area not being occupied by the workpiece.

6. A method of measuring according to claim 5, wherein, during said step of measuring the depth of the dicing groove, a vertical position of the ultrasonic detector is at a first height, and during said measurement of the extension groove said ultrasonic detector is at a second height, said first height and said second height being different from each other.

7. A method according to claim 5, further comprising a step of flowing water over the workpiece during said cutting step, said water being held on the surface of the workpiece by a skirt.

8. A method according to claim 6, further comprising a step of flowing water over the workpiece during said cutting step, said water being held on the surface of the workpiece by a skirt.

9. A dicing apparatus, comprising:

a cutting blade configured to rotate at a high rotating speed;

a stage supporting a plate-shaped workpiece and an adhesive sheet, said plate-shaped workpiece and said adhesive sheet being immobilized upon said stage;

an ultrasonic detector means for emitting ultrasonic waves and for measuring at least one of a time interval between emission of the ultrasonic waves and a return of an echo of the ultrasonic waves from the plate-shaped workpiece and a phase difference between the admitted ultrasonic waves and the echo thereof;

ultrasonic detector moving means for moving the ultrasonic detector such that the ultrasonic detector is held at a first vertical position for measuring a depth of a dicing groove cut partially through a thickness of the workpiece, and a second vertical position for measuring a depth of a dicing groove cut completely through the thickness of the workpiece, said second vertical position being determined such that said dicing groove is cut to a depth which corresponds to a depth of a cutting portion of a periphery of the cutting blade.

10. A dicing apparatus according to claim 9, said apparatus further comprising a skirt means for holding a liquid on a surface of the workpiece, after said liquid is flowed over the workpiece as a cutting fluid.

* * * * *